United States Patent [19]

Karasawa et al.

[11] Patent Number: 5,021,294

[45] Date of Patent: Jun. 4, 1991

[54] PLASTIC SLIDES FOR MICROSCOPES

[75] Inventors: Yoshiharu Karasawa; Ken Hirohashi, both of Tokyo, all of Japan

[73] Assignee: Biomate Co., Ltd., Japan

[21] Appl. No.: 99,471

[22] Filed: Sep. 22, 1987

[30] Foreign Application Priority Data

Sep. 24, 1986 [JP] Japan ................... 61-223862

[51] Int. Cl.$^5$ .................... B32B 13/12; B32B 27/06
[52] U.S. Cl. .................... 428/332; 428/419; 428/420; 428/451; 428/517; 428/518; 428/532; 428/702; 428/913; 428/483
[58] Field of Search ............ 428/332, 451, 419, 517, 428/518, 532, 483, 420, 543, 913

[56] References Cited

U.S. PATENT DOCUMENTS

| | | | |
|---|---|---|---|
| 3,895,169 | 7/1975 | Wichterle | 428/420 |
| 4,386,991 | 6/1983 | Shiomi et al. | 428/420 |
| 4,459,317 | 7/1984 | Lambert | 428/420 |
| 4,565,740 | 1/1986 | Gölander et al. | 428/532 |
| 4,575,465 | 3/1986 | Viola | 428/532 |
| 4,588,624 | 5/1986 | Nygren et al. | 428/532 |
| 4,592,954 | 6/1986 | Malhotra | 428/532 |

*Primary Examiner*—P. C. Sluby
*Attorney, Agent, or Firm*—Ostrolenk, Faber, Gerb & Soffen

[57] ABSTRACT

The present invention is directed to a hydrophilic transparent plastic slide for a microscope and a method for preparing the same. This slide is characterized in that at least one surface of the slide is rendered hydrophilic so that a staining solution which is generally used in microscopic examination may not be repelled thereon. Further, according to the present invention, the plastic slides can be manufactured by providing at least one surface of each slide with a hydrophilic layer of silicon oxide, a polysaccharide or the like.

9 Claims, No Drawings

PLASTIC SLIDES FOR MICROSCOPES

BACKGROUND OF THE INVENTION

1. Field of the Invention

The present invention relates to slides for microscopes, and in particular it relates to plastic slides each having a hydrophilic surface and a method for manufacturing them.

2. Description of the Prior Art

A slide for a microscope is used to examine a specimen thereon through the microscope. The microscopic examination is usually carried out as follows: The specimen which will be examined through the microscope is first generally microsectioned, if it is not so thin as to transmit light. Then the specimen is put on the slide, and it is stained, if necessary. A cover is then put thereon, and the specimen is now ready for examination. The term "slide" used in this specification is a general term inclusive of the slide itself and the cover. The slide can be handled in the following either manner: (1) after the microscopic examination, the slide with a specimen is discarded, or (2) after the examination, the slide is preserved as a permanent specimen, which may be prepared by putting a fixed specimen on the slide, staining the specimen, dehydrating it and coating it with a mounting medium, and putting a cover thereon.

The above-mentioned handling (1) is mainly employed in clinical examination That is, in examining urine, sputum, blood, feces and the like, each specimen is put on the slide, and after the microscopic examination, it is thrown away. The other handling (2) is principally taken in the medical science of pathology and the like, and for example, microsectioned tissues of internal organs may be preserved as permanent specimens for a microscope.

Heretofore, the slides for the above-mentioned purposes have been made from glass since the microscope began to be used. However, the slides made of glass, i.e., the glass slides have the following drawbacks: (A) they are liable to be broken; (B) they are heavy (their density is high); (C) they are brittle and weak, so that they cannot take a thin form; (D) they cannot be folded; (E) they cannot be cut arbitrarily; (F) after use, they cannot be burnt away, which fact causes an environmental problem; (G) when stored for a long period of time or under bad conditions (under such high-temperature and high-humidity conditions as in a ship's hold), they deteriorate and become whitely turbid; (H) alkali and heavy metal are separated out from the used glass, and these substances have a bad influence on specimens; (I) a worker is apt to be hurt by their edges or when the glass is broken, and at this time, if the specimen contains a pathogen, for example, a hepatitis virus or an AIDS virus, the worker will be infected therewith through the wound position, in high probability; and (J) they are difficult to cut with a high demensional accuracy in manufacturing them, and after cutting, their surfaces are contaminated with a glass powder and therefore an additional process such as a washing step is required.

In order to partially eliminate these drawbacks, plastic covers have been recently used in some fields. However, these plastic covers are made only by cutting a high-transparent film, for example, a cellulose triacetate film. Therefore, such covers are definitely different from the slides of the present invention, and hence the latter is not restricted by the former at all.

SUMMARY OF THE INVENTION

A first object of the present invention is to provide tough and light-weight plastic slides and a method for manufacturing them.

A second object of the present invention is to provide safe and unpolluting plastic slides and a method for manufacturing them.

A third object of the present invention is to provide inexpensive plastic slides having a good long-term storage stability and a method for manufacturing them.

A fourth object of the present invention is to provide plastic slides from which any alkali and heavy metal are not separated out and a method for manufacturing them.

A fifth object of the present invention is to provide freely cuttable and foldable plastic slides and a method for manufacturing them.

A sixth object of the present invention is to provide plastic slides not emitting any fluorescence and a method for manufacturing them.

A seventh object of the present invention is to provide plastic slides which can be cut with a good dimensional accuracy and a method for manufacturing them.

An eighth object of the present invention is to provide a method for manufacturing such hydrophilic plastic slides.

According to one aspect of the present invention, there is provided a plastic slide for a microscope characterized by comprising a transparent plastic, at least one surface of which is rendered hydrophilic.

According to another aspect of the present invention, there is provided a method for manufacturing hydrophilic slides by forming a silicon oxide layer or a cross-linked layer of a polysaccharide, its derivative, a hydrophilic synthetic polymer or a mixture thereof on at least one surface of each transparent plastic slide.

DESCRIPTION OF THE PREFERRED EMBODIMENT

In the case that an optical microscope is used, most specimens inclusive of biological specimens are usually stained after being put on slides, in order to facilitate microscopic examination. In this case, if the surface of the slide is hydrophobic, the staining solution is repelled thereon and therefore it does not penetrate into the specimen. Further, when a permanent specimen of a microsectioned tissue of an internal organ or the like is prepared, the specimen is embedded in a paraffin brick and is then formed into a thin piece having a thickness of 2 to 3 $\mu$m by the use of a microtome. Afterward, the piece is floated on water and is then scooped up with a slide, followed by drying on a slide warmer. At this time, if the slide is not hydrophilic, water present between the specimen microsection and the slide is confined therebetween, and therefore the specimen does not adhere to the slide, so that the specimen microsection will peel off from the slide in the subsequent steps of deparaffin, staining, dehydration and the like for the preparation of the permanent specimen.

For this reason, transparent plastic films which have been only cut into a suitable size cannot be used as the slides. Hence, it is necessary to make the plastic films hydrophilic.

The inventors of the present application have found that a slide for a microscope which is made of a transparent plastic film having at least one hydrophilic surface is excellent in quality compared to a conventional glass slide, and on the basis of this knowledge, the present invention has been completed. This plastic slide may be prepared by first rendering hydrophilic at least one surface of a transparent plastic film on condition that the obtained hydrophilic surface is inactive to a specimen, and by then cutting the thus treated plastic film into a suitable size.

Examples of the transparent plastic film used in the present invention include polyethylene terephthalate (hereinafter referred to simply as PET), polyvinyl chloride, polymethyl methacrylate, polystyrene, polycarbonate, polymethyl pentene, polyethers, sulfones, polysulfones and copolymers thereof. Of these plastic materials, particularly preferable are PET, polymethyl pentene, polysulfone and polyvinyl chloride which are resistant to chemicals such as organic solvents, acids and alkalis, and PET is most preferable. However, in use applications where a chemical resistance is not required, any kind of plastic can be employed, insofar as it is transparent. In the transparent plastic films, an important requirement is that light transmission is excellent, and it is preferred that the transparent plastic film has a light transmittance of 70% or more, preferably 80% or more. In the case that the slide the surface of which has been subjected to a frost treatment is used, a light transmittance of 70% or less also is acceptable.

Further, the thickness of the plastic film used in the present invention is preferably within the range of 75 to 500 $\mu$m, more preferably within the range of 150 to 300 $\mu$m. When the thickness is less than 75 $\mu$m, the plastic film is too flexible, so that it folds inconveniently at the time of its use. When it is more than 500 $\mu$m, the light transmittance of the film deteriorates and its weight also increases, which facts impair the advantages of the plastic slide.

In order to render the plastic film hydrophilic, any known method can be used in the present invention. However, it is important that the surface of the plastic film which has been made hydrophilic, is inactive to specimens and staining and is not dissolved with water and organic solvents.

Methods of rendering the plastic film hydrophilic which can satisfy the above-mentioned requirements are as follows: (1) a method for forming a transparent inorganic layer of a metallic oxide such as silicon oxide, tin oxide or indium oxide on the plastic film by means of vapor deposition or coating; (2) a method for first coating the surface of the plastic film with a polysaccharide such as cellulose, agarose, agar, dextran, chitosan, carrageenan, locust bean gum, guar gum, methyl cellulose, hydorxymethyl cellulose, carboxymethyl cellulose or a derivative thereof, or a hydrophilic synthetic polymer such as polyvinyl pyrrolidone, polyhydroxyethyl methacrylate or polyvinyl alcohol, and then crosslinking the coating film by the use of a crosslinking agent to form a water-insoluble hydrophilic layer thereon, and (3) a method for treating the surface of the plastic film by means of plasma etching, corona discharge, ionizing radiation or a chromic acid mixture in order to oxidize and activate the film surface and to thereby provide a hydrophilic nature thereon. These methods just described may be employed alone or in combination thereof. In particular, it is very effective that after the activation treatment by the method (3), the method (1) or (2) is utilized so as to render the plastic flim hydrophilic.

Of these methods for providing the hydrophilic nature, the method (2) is especially effective in the present invention. Therefore, reference to this method (2) will be made in detail.

The present invention has been completed by paying much attention to the facts that a naturally occuring polysaccharide, having many hydroxyl groups in its molecule, is hydrophilic and that its structure is chemically stable, particularly to organic solvents. That is, the present invention can be achieved by first dissolving the polysaccharide in a suitable solvent, then coating the surface of the transparent plastic film therewith, and crosslinking the polysaccharide.

The polysaccharide is generally water-soluble and can thus be used in the form of an aqueous solution. The concentration of the polysaccharide in the aqueous solution depends on the polymerization degree of the used polysaccharide but is usually within the range of 0.1 to 5 wt %, preferably 0.5 to 2 wt %, and the coating operation of the polysaccharide is carried out so that a thickness of the polysaccharide on the plastic film surface may be 0.03 to 5.0 $\mu$m, preferably 0.1 to 2.0 $\mu$m. Examples of the solvents which can be used in the present invention include water, methanol, formamide, tetrahydrofuran, dimethylformamide and N-methylpyrrolidone. They can be used alone or in combination thereof in compliance with the intended purpose. Further, in the case that a sparingly soluble polysaccharide such as cellulose or chitin is used, a salt such as lithium chloride may be added thereto, as disclosed in Japanese Patent Provisional Publication No. 171712/1982.

The crosslinking agents usable in the present invention must have two or more functional goups which can react with functional groups such as —NH$_2$, —COOH and —OH in the polysaccharide. Examples of these crosslinking agents include aldehydes such as formaldehyde, glutaraldehyde, glyoxal and $\alpha$-hydroxadipaldehyde; their acetals; aminomethylol compounds such as dimethyl urea dimethylethylene urea, trimethylolmelamine and dimethylolethyltriazone; polycarboxylic acids such as citric acid, tetracarboxybutane and diglycol; chlorides of dibasic acids such as succinic acid, adipic acid and sebatic acid; epoxy compounds such as epichlorohydrin and butadiene epoxide; ethyleneimine compounds such as tetramethylene-bis-N,N'-ethylene urea, tris(1-adinidil)phosphine oxide and 1,1'-carbonylbisadiridin; divinyl compounds such as divinyl sulfone, 1,3-divinylpropane, 1,4-divinylbutane and diethylene glycol divinyl ether; and polyisocyanate compounds such as hexamethylene diisocyanate and toluene diisocyanate. Of these compounds, formaldehyde is particularly suitable for the present invention because formaldehyde has a strong crosslinking property to the polysaccharide and is easily operatable and inexpensive, and because the coating film of the polysaccharide crosslinked thereby is tough.

The crosslinking treatment can be carried out by first dissolving 0.01 to 5.0 mol %, preferably 0.5 to 2.0 mol % of the selected crosslinking agent in the solvent to preare a solution, and then bringing the thus prepared solution into contact with the polysaccharide with which the surface of the plastic film has been coated. The contacting operation may be performed in a known manner, e.g., by dipping, brushing or spraying, or by the use of any kind of spinner or coater. The reaction time necessary for the crosslinking depends on a kind of selected crosslinking agent but it is usually within the range of 5 seconds to 30 minutes and, on the average, 1 to 5 minutes. In addition, in order to accelerate the crosslinking reaction, a catalyst may be used, a temperature of the crosslinking solvent may be raised, and the plastic film which has been contacted with the crosslinking agent may be heated by means of a dryer.

Usually, the hydrophilic nature is given onto either surface of the specimen, but if necessary, it can be given onto both the surfaces thereof, needless to say.

With regard to the plastic slide obtained by the present invention, the surface thereof may be printed with lines or figures, or all or a part of each surface may be subjected to a frost treatment so as to roughen it. This frost treatment may be carried out by screen-printing the plastic film with an ink which is capable of roughing the surface thereof. Covers with which the specimens on the slides will be covered can also be manufactured by the present invention.

Now, the present invention will be described in detail in accordance with examples.

EXAMPLE 1

A hard polyvinyl chloride material having a light transmittance of 80% and a thickness of 150 μm was cut out into 25×75 mm films. Separately, a 4% isopropyl alcohol solution of ethyl silicate was prepared, and the aforesaid films were then dipped into this solution. The films were then removed therefrom and were dried at 120° C. for 30 minutes in order to form a silicon oxide layer having a thickness of 1 μm on the surface of each film, thereby obtaining plastic slides.

EXAMPLE 2

In a plasma etching device, 25 mm × 75 mm polyester films of 175 μm thick were set, and a high frequency of 13.5 MHz was applied thereto under an oxygen partial pressure of 0.5 torr at an output of 55W to perform a plasma treatment for 2 minutes, thereby activating their surfaces. The thus activated surfaces were then coated with a 1% aqueous agar solution at 50° C. by the use of a Baker type applicator so that a coating weight might be 20 g/m$^2$, followed by air drying. After the air drying step, the films were then dipped in a 2 wt % aqueous formalin solution for 30 seconds, and were put in an oven at 100° C. for 3 minutes in order to carry out a crosslinking treatment, thereby obtaining hydrophilic polyester films. For these films, a wettability index was measured in accordance with JIS K6768, and as a result, it was found that the wettability index was 40 dyn/cm$^2$, which fact indicated that the plastic films could get wet as easily as glass.

The same procedure as in the above operation was repeated with the exception that 18 mm × 18 mm cellulose triacetate films of 100 μm thick were used, thereby obtaining plastic cover films.

EXAMPLE 3

Hydrophilic films obtained in Example 2 were dipped respectively in beakers containing water, alcohol, xylol, dimethylformamide, tetrahydrofuran and N-methylpyrrolidone for 3 days. After 3 days, the films were taken out therefrom, and the solvents were dried and removed therefrom. Afterward, a wettability index of each film was measured. The result indicated that the measured index was unchanged from before the dipping treatment.

EXAMPLE 4

The hydrophilic film obtained in Example 2 was rubbed 100 times with a sponge impregnated with water for tableware under a load of 2 kg, and the wettability index was measured The measured index was unchanged from before the rubbing test.

EXAMPLE 5

Permanent specimens were prepared in an ordinary manner by the use of the plastic slide and cover obtained in Example 2, and a commercial glass slide (25 mm × 75 mm, and 0.9 mm is thickness) and a cover (18 mm × 18 mm). Microsectioned tissue pieces of a stomach which had been fixed with an alcohol were embeded in a paraffin and were then cut into sections of 2 μm in thickness, and each section was floated on water and was then scooped up with the slide. The slide was afterward put on a slide warmer to dry it. At this time, air bubbles and water droplets did not remain between the specimen and the PET slide, and therefore the specimen was finely expanded on the PET slide, as in the case of the glass slide. Next, in accordance with an ordinary procedure for the preparation of the permanent specimens, the following steps were taken: (1) passing each slide through a xylol bath three times to remove the used paraffin therefrom, (2) passing through an alcohol bath three times to remove the used xylol, (3) passing through a water bath to remove the alcohol, (4) passing through a 0.1% aqueous hematoxylin solution to stain cell nuclei, (5) washing with water, (6) passing through a 0.5% aqueous eocin solution to stain cytoplasms, (7) washing with water, (8) passing through an alcohol bath three times to remove water, (9) passing through a carbol/xylol (⅓ v/v) bath and a xylol bath to render the specimen transparent, and (10) spraying balsam on the specimen and covering the latter with the cover. In the respective steps mentioned above, the microsectioned tissue which was the specimen was not peeled from the slide, and all the same procedures as in the preparation of the permanent specimens of the glass slides could be utilized. When the thus obtained permanent specimens were examined through a microscope, no difference was present between the glass slide and the PET slide. Incidentally, weights of the permanent slides made of PET and glass were 0.58 g and 6.1 g, respectively.

COMPARATIVE EXAMPLE

The same procedure as in Example 5 was repeated with the exception that a 188-μm-thick PET slide (25 mm × 75 mm) the surface of which had not been rendered hydrophilic was used, in order to prepare a permanent specimen. However, when the section of the specimen floated on water was scooped up by the slide, water droplets penetrated into the interstice between the specimen and the slide were not removed easily therefrom by means of a slide warmer. After 1 hour's drying, these droplets were eliminated at long last, but voids were instead formed therebetween. Next, this slide was passed through a xylol bath with the intention of removing the paraffin, as in Example 5. However, at the time of passing through the first xylol bath, the specimen was peeled from the slide. After all, this permanent specimen could not be prepared.

EXAMPLE 6

For three kinds of commercial soda glass and borosilicate glass slides as well as the PET slide of the present invention obtained in Example 2, an alkali elution degree test (JIS R3502 test procedure) was carried out. As a result, in the case of the soda glass slide, the amount of the eluted alkali in the test was 0.45 mg in terms of sodium oxide, and in the case of the borosilicate glass slide, it was 0.3 mg. However, with regard to the PET slide, the eluted alkali was 0.001 mg or less and in fact it could not be detected.

EXAMPLE 7

From the PET permanent slide prepared in Example 5, a 25 mm × 36 mm piece inclusive of the specimen thereon was separated, and the piece was then held between a pair of mounts for a slide projector, thereby obtaining a mounted permanent specimen for a microscope. Next, when this permanent specimen was put in the slide projector and was then projected on a screen, a 40-fold enlarged image could be seen. Further, this specimen could be preserved in a slide album for a slide projector.

EXAMPLE 8

The PET permanent specimen prepared in Example 5 and a glass permanent specimen were each placed in a polyethylene bag having a thickness of 50 μm, and each bag containing the specimen was inserted into a postal envelope to make letters. Afterward, the letters each containing the specimen therein were sent by post from Tokyo to Osaka. When these letters were opened in Osaka, it was appreciated that the glass permanent specimen was broken, whereas the plastic permanent specimen had no trouble.

EXAMPLE 9

On the PET slide prepared in Example 5, screen printing was given, so that a line having a width of 1 mm and a thickness of 10 μm was depicted on a periphery of the slide and two similiar lines were depicted on the slide in its longitudinal direction so as to divide it at an interval of 25 mm. In this way, the slide for a urinary sediment test could be obtained by which 3 specimens could be examined at one time.

EXAMPLE 10

By the use of the PET slide and the cover prepared in Example 5, a neurilemma was cultivated. For comparison, the identical cultivation was carried out by the use of a slide and a cover made from usual soda glass. After 7 days, it was observed that the former continued to grow but the latter was prevented from growing.

EXAMPLE 11

A slide made from soda glass and the PET slide prepared in Example 5 were kept in an atmosphere at a temperature of 50° C. at a humidity of 95% for 40 days. Afterward, an appearance of the slides was observed. The surface of the soda glass slide seemed to be whitely turbid, but the PET slide had no problem.

What is claimed is:

1. A slide for a microscope comprising a transparent polymer film having at least one surface layer which is hydrophilic, inactive to both specimens and staining and insoluble in water and organic solvent, said hydrophilic layer being selected from the group consisting of metal oxide, cross-linked polysaccharide or derivative thereof, and cross-linked synthetic plastic.

2. A slide for a microscope according to claim 1 wherein said transparent polymer film is a film of polyvinyl chloride, polymethyl pentene, polysulfone or polyethylene terephthalate.

3. A slide for a microscope according to claim 2 wherein said polyethylene terephthalate film has a light transmittance of 70% or more and a thickness of 75 to 500 μm.

4. A slide for a microscope according to claim 1 wherein at least one surface of said transparent polymer film has a layer of silicon oxide thereon to thereby render said polymer hydrophilic.

5. A slide for a microscope according to claim 1 wherein at least one surface of said transparent polymer film has a layer of a polysaccharide, a derivative of said polysaccharide, a hydrophilic synthetic plastic or a mixture thereof, and said layer is crosslinked by the use of an crosslinking agent to thereby render said surface hydrophilic.

6. A slide for a microscope according to claim 5 wherein said polysaccharide is selected from the group consisting of agar, agarose, chitosan, cellulose, carrageenan, dextran and derivatives thereof.

7. A slide for a microscope according to claim 5 wherein said crosslinking agent is an aldehyde or epichlorohydrin.

8. A slide for a microscope according to claim 5 wherein said polysaccharide is agar or agarose and said crosslinking agent is formaldehyde.

9. A slide according to claim 3 wherein the transparency is at least 80% and the thickness is 150 to 300 μm.

* * * * *